United States Patent
Imai et al.

(10) Patent No.: US 6,492,650 B1
(45) Date of Patent: Dec. 10, 2002

(54) SENSOR UNIT FOR USE IN A MULTIPLE SENSOR UNIT ARRAY

(75) Inventors: Kiyoshi Imai; Takashi Kamei; Hiroyuki Inoue; Kiyohiko Gondo; Kazunori Osako, all of Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/869,194

(22) PCT Filed: Oct. 24, 2000

(86) PCT No.: PCT/JP00/07420
§ 371 (c)(1),
(2), (4) Date: Jun. 25, 2001

(87) PCT Pub. No.: WO01/31607
PCT Pub. Date: May 3, 2001

(30) Foreign Application Priority Data

Oct. 25, 1999 (JP) ............................................. 11-303181

(51) Int. Cl.[7] ................................................ G02B 27/00
(52) U.S. Cl. ....................................... 250/551; 250/221
(58) Field of Search ................................ 250/551, 221, 250/214.1, 239; 340/555–557; 359/127, 133, 174, 152, 154

(56) References Cited

U.S. PATENT DOCUMENTS 4,508,399 A * 4/1985 Dowling et al. ............. 439/404

FOREIGN PATENT DOCUMENTS

| JP | 4-121132 | 10/1982 |
| JP | 3-30339 | 3/1991 |

* cited by examiner

*Primary Examiner*—Que T. Le
(74) *Attorney, Agent, or Firm*—Foley & Lardner

(57) ABSTRACT

The sensor unit (1) of the present invention comprises a housing (2) which is adapted to be mounted on a DIN rail (10) closely one next to another as a sensor unit array, and to be connected to a sensor head (4a and 5a) via a cable (4 and 5). The housing (2) accommodates a sensing circuit system (101, 102; 201 to 205) for achieving a desired sensing function in cooperation with the sensor head (4a and 5a), a first optical communication circuit system (210, 211) including a light emitting device (206) and a light receiving device (207) for conducting an optical bi-directional communication with one of the adjacent sensor units in the multiple sensor unit array, and a second optical communication circuit system (212, 213) including a light emitting device (208) and a light receiving device (209) for conducting an optical bi-directional communication with the other of the adjacent sensor units, whereby the sensor unit (1,1) is enabled to conduct an optical bi-directional communication with each of the adjacent sensor units in the multiple sensor unit array.

23 Claims, 14 Drawing Sheets

SENSOR UNIT FOR USE IN A MULTIPLE SENSOR UNIT ARRAY

TECHNICAL FIELD

The present invention relates to a sensor unit which is suitable for use in a multiple sensor unit array of a main body unit for an optical fiber type photoelectric sensor, a proximate sensor having a separate sensor head, an ultrasonic sensor having a separate sensor head or the like, and in particular to a sensor unit which is suitable for performing a bi-directional optical data communication between the adjacent sensor units.

BACKGROUND OF THE INVENTION

Various sensors such as photoelectric sensors, proximate sensors and ultrasonic sensors are used for detecting the presence or position of an object as a part of factory automation (FA). In particular, optical fiber type photoelectric sensors that have separate sensor heads are widely used in compact and high-density machines which are required to be controlled because such sensors can be mounted in a limited space. The term "sensor" as used herein includes those producing a switching output by comparing a detected value with a threshold value as well as those for producing the detected value as an analog or a digital value.

In the case of a sensor having a separate sensor head as is the case with an optical fiber type photoelectric sensor, the sensor head and the main body unit are joined by a cable (consisting of an optical fiber cable in the case of a photoelectric sensor, or an electric cable in the case of a proximate sensor or an ultrasonic sensor). The main body unit is sometimes called as an amplifier unit in the industry. The main body unit is called in the following description as a "sensor unit".

The housing of a sensor unit accommodates various circuits such as a drive circuit for driving a sensor head and a signal processing circuits for processing the signal from the sensor head and generating an output signal of a desired form. In other words, the sensor unit housing accommodates a sensing circuit system which achieves a desired sensing function in cooperation with the sensor head.

Conventionally, sensor units for use in a multiple sensor unit array have been developed with the aim to accommodate a large number of sensor units in a console board or the like. Such a sensor system incorporating a large number of sensor units closely one next to another is illustrated in FIG. 14. The illustrated sensor units each consist of a main body unit (often called as an amplifier unit) of an optical fiber type photoelectric sensor.

As shown in the drawing, this sensor system comprises a DIN rail 301 placed inside a control console or the like, and a plurality of sensor units 300, 300, . . . which are adapted to be used in a multiple sensor unit array and mounted on the DIN rail 301 closely one next to another. In other words, each sensor unit 300 is mounted on the DIN rail 301 in alignment with other sensor units by fitting a DIN rail mount groove 302 formed in the bottom surface of the housing onto the DIN rail 301.

A pair of optical fiber cables consisting of an outgoing optical fiber cable 303 and an incoming optical fiber cable 304 extend from the rear surface of the housing of each sensor unit 300, and the free ends of these optical fiber cables 303 and 304 are connected to sensor heads 303a and 304a which are placed in a detection region.

An electric cable (or cord) 305 extends from the front surface of the sensor unit 300 to produce a switching output or a signal indicating the intensity of the received light which is generated by the sensing circuit system (not shown in the drawing) inside the unit housing. This electric cable 305 is connected to external control equipment such as a programmable logic controller (PLC) which is not shown in the drawing.

As the presence or position of an object is detected by the sensor heads 303a and 304a of the optical fiber cables 303 and 304 according to the change in the transmitted or reflected light, by virtue of the prescribed operation of the sensing circuit system of the sensor unit 300, a detection signal (a switching output or a signal indicating the intensity of the received light) is forwarded to control equipment such as a programmable logic controller (PLC) via the cable 305.

Thus, according to the sensor system described above, because the outer profile of the housing of each sensor unit 300 has a flat configuration with its small side aligned with the direction of the array, and is provided with a DIN rail mount groove 302 in its bottom surface, if the control console is provided with a DIN rail 301, a large number of such independent sensor units 300 can be mounted on the DIN rail 301 closely one next to another in a highly compact fashion.

In recent years, the sensing circuit system incorporated in the sensor unit is given with a progressively higher functionality and performance so that the sensor unit may be adapted to a greater variety of objects and a wider range of detecting conditions. Therefore, there is a growing need to set up the conditions for a larger number of data items for each sensor unit and to monitor the sensor unit to place the sensor unit in an optimum condition for detecting a greater variety of objects and a wider range of detecting conditions.

Such set-up work has been conventionally performed manually by manipulating small set-up keys provided on outer surface of each sensor unit housing while viewing a display unit which is typically difficult to read. Therefore, such work has been known to be irritating and time-consuming.

The sensor unit housing is made smaller and smaller because of the growing demand for more compact design. This trend severely hampers the effort to solve the problems associated with the inconvenience in manipulating the set-up keys on the sensor unit housing and the difficulty in reading the display on the sensor unit.

The inventors have conducted a research to the end of eliminating such problems of the prior art, and have conceived the idea that if each pair of adjacent sensor units in a sensor unit array can transfer data between them in both directions, it will become possible to provide a data set-up unit of good manipulability at an end of the sensor unit array which is easily accessible, and to transfer the data from the data set-up unit to each sensor unit. Also, it will become possible to transfer the data of each sensor unit to the sensor unit at an end of the array so that the data may be monitored on a data display device which provides a favorable visibility.

Implementation of such an idea requires an arrangement which allows a bi-directional data transfer between each pair of adjacent sensor units. However, in the technical field of sensor systems, no appropriate prior art is available that serves this purpose.

For instance, Japanese patent laid open publication (kokai) No. 9-64712 discloses a detection switch system in which a female connector and a male connector are provided on opposing surfaces of each pair of adjacent detection switches (which correspond to the sensor units of the present invention), and are joined together electrically so that the control circuit board of each detection switch may be supplied with electric power for the adjacent detection switch, and the light emission timing may be suitably varied from one detection switch to another by passing an external synchronization signal from the upstream detection switch to the downstream detection switch with a suitable time delay.

However, to achieve such a bi-directional data transfer system contemplated by the inventors, it is necessary to arrange a large number of sensor units, typically from 16 to 64 sensor units, in a series. Therefore, when a contact type connector is used for signal transfer means between each pair of adjacent sensor units as shown in the above publication, the signal transmission path contains so many contact points which may become faulty that such an arrangement would be too unreliable for any practical purpose.

Because the synchronization signal in this prior patent publication is intended for delaying the timing of light emission, the transfer of data takes place only in one direction, and this prior art is therefore based on a concept which is fundamentally different from that of the bi-directional data transfer contemplated by the inventors.

Also, the contact type connector disclosed in this prior patent publication requires a projection and a recess to be provided on either side surface of the sensor unit housing, and this not only necessitates a higher precision for the metallic die assembly for molding the sensor unit housing but also causes some inconvenience in stocking and packaging the parts of sensor unit. Because the connector involves a male and female engagement, when any particular sensor unit has become faulty and is required to be replaced, it is not possible to remove only the faulty sensor unit from the DIN rail, and the maintenance work such as replacing a sensor unit tends to require an excessive amount of work.

This invention was made in view of such problems of the prior art, and its primary object is to provide a sensor unit which allows a reliable bi-directional data transfer between each pair of adjacent sensor units in a sensor system using an array of sensor units.

Another object of the present invention is to provide a sensor unit which allows a reliable bi-direction data transfer between each pair of adjacent sensor units, and has flat housing side surfaces so that each sensor unit may be replaced without being interfered by the adjacent sensor units, and the manufacturing cost may be reduced through simplification of the design of the metallic molding die assembly.

Yet another object of the present invention is to provide a sensor unit which allows a reliable bi-directional data transfer between each pair of adjacent sensor units in a sensor system using an array of sensor units so that more enhanced data set-up manipulation and monitoring may be enabled through integration of various functions in each sensor unit.

Other objects and advantages of the present invention will become apparent to a person skilled in the art from the following description.

BRIEF SUMMARY OF THE INVENTION

The sensor unit of the present invention is provided with a housing that allows a number of such sensor units to be arranged closely one next to another, and is adapted to be connected to a sensor head via a cable.

The "cable" as used herein means an optical fiber cable in the case of a photoelectric sensor, and an electric cable (cord) in the case of a proximate sensor or an ultrasonic sensor. The arrangement for mounting a number of sensor units is not limited to the one using a DIN rail, but may consist of any means or structure for mounting a number of sensor units.

The housing accommodates a sensing circuit system, and first and second optical communication circuits.

The sensing circuit system performs the desired sensing function in cooperation with the sensor head. The "desired sensing function" as used herein may vary depending on the kind of the sensor unit (photoelectric sensor, proximate sensor, ultrasonic sensor, and so on).

For instance, when the sensor unit consists of a photoelectric sensor, the sensing function consists of a photoelectric detecting function of either transmission or reflection type using a detection medium consisting of a detection light beam (of visible light, infrared light or the like). When the sensor unit consists of a proximate sensor, the sensing function consists of an object detecting function which is based on the change in properties such as the oscillation amplitude and oscillation frequency of an internal oscillation circuit due to the presence of an object in proximity. When the sensor unit consists of an ultrasonic sensor, the desired sensing function consists of an object detection function based on the use of a detection medium consisting of ultrasonic sound.

The "sensing circuit system" as used herein includes not only hardware for achieving the desired sensing function but also software which operates a microprocessor so as to perform specific functions.

The first optical communication circuit system comprises a light emitting device and a light receiving device for conducting a bi-directional communication with one of the adjacent sensor units when a plurality of such sensor units are arranged closely one next to another. Likewise, the second optical communication circuit system comprises a light emitting device and a light receiving device for conducting a bi-directional communication with the other of the adjacent sensor units when a plurality of such sensor units are arranged closely one next to another.

The "bi-directional optical communication" as used herein means that not only transmission but also reception is enabled. It however does not matter if the bi-directional optical communication is conducted in full duplex mode or half duplex mode.

The first and second optical communication circuit systems each include not only a light emitting device such as a light emitting diode and a light receiving device such as a photodiode but also various other electric components that are required for optical communication such as software for transmission, a parallel/serial conversion circuit, a light emitting device drive circuit, a light receiving device output amplifier circuit, a serial/parallel conversion circuit and software for reception.

The term "optical communication circuit system" is used herein to distinguish from the "sensing circuit system". The structure of the optical signal transmission path between the light emitting device and light receiving device within the sensor housing can be freely selected. Light guiding means such as optical fiber cables, prisms and mirrors may be used to form all of or a part of the optical path between the light emitting device and light receiving device.

According to this structure, a bi-directional optical communication is enabled between each pair of adjacent sensor units in an array of sensor units, and as there is no need for a connector relying on a physical contact for transmission of signals between the adjacent sensor units, a high level of reliability can be ensured even when a large number of sensor units are arranged in an array for signal transfer.

According to a preferred embodiment of the present invention, the housing is provided with a first optical communication window provided on one side thereof for conducting an optical bi-directional communication with one of the adjacent sensor units in the sensor unit array, a second optical communication window provided on the other side thereof for conducting an optical bi-directional communication with the other of the adjacent sensor units in the sensor unit array, whereby the sensor unit is enabled to conduct an optical bi-directional communication with each of the adjacent sensor units in the sensor unit array via a corresponding one of the optical communication windows.

According to this structure, because the optical communication between each pair of adjacent sensor units is accomplished via the optical communication windows, the sides of the housing may consist of flat surfaces so that a significant cost reduction can be accomplished owing to the simplification of the metallic die assembly for molding the housing, and the simplification of the stocking and packaging of the sensor unit. Furthermore, when an array of such sensor units are mounted on a DIN rail closely one next to another, there is no mechanical interference between adjacent sensor units, and the work required in replacing one of the sensor units is simplified.

The optical communication window provided on each side of the housing may be fitted with a visible light cut-off filter, an optical lens or the like. Such a structure improves the efficiency in emission and reception of light and reduces noises in the optical communication by the light emitting device and light receiving device so that the tolerance in the relative positioning of adjacent sensor units is increased, and the reliability of the optical communication is improved.

The optical lens provided in the optical communication window on each side of the housing may consist of a semi-cylindrical lens having a flat surface facing outward and shared by the light emitting device and light receiving device, the light emitting device and light receiving device being arranged along an axial direction of the semi-cylindrical lens, and being reversed in position from one side of the housing to the other so as to complementarily oppose the counterparts thereof in the corresponding adjacent sensor unit in the sensor unit array.

According to this arrangement, because the single optical lens can be used for both emission and reception of light, the optical system can be simplified in structure, the work required in aligning the optical center lines is simplified, and a cost reduction can be accomplished.

The sensor unit of the present invention may further comprise data transfer control means for enabling a bi-directional transfer of data between each pair of adjacent sensor units in the manner of a bucket brigade by controlling the first and second optical communication circuit systems.

According to this structure, by passing the data received from one of the adjacent sensor units to the other adjacent sensor unit, a quick data transfer from one sensor unit to another can be accomplished.

As can be readily appreciated, the sensor unit of the present invention may consist of a photoelectric sensor, a proximate sensor or an ultrasonic sensor by appropriately designing the sensing circuit system.

A sensor system of the present invention incorporating a sensor unit array consisting of a large number of such sensor units has a novel structure, and provides novel advantages.

Specifically, according to the sensor system of the present invention, because a bi-directional exchange of signals between adjacent sensor units is enabled, it is possible to monitor a large number of sensor units or arbitrarily selected sensor units with a simple operation, in particular without requiring to individually operate the associated sensor units, by forwarding a monitor request command to the particular sensor units from an end of the sensor unit array via the intervening sensor units to be executed by the associated sensor units, and having responses therefrom returned to the source of the request command or the sensor unit at the end of the sensor unit array.

In a similar fashion, by replacing the monitor request command with a data setting command, setting of data to a large number of sensor units or arbitrarily selected sensor units can be executed with a simple operation, instead of individually operating the associated sensor units.

DETAILED DESCRIPTION OF THE PREFERRED EMBODIMENTS

Now a sensor unit and a sensor system embodying the present invention are described in the following with reference to the appended drawings.

Figure 1:
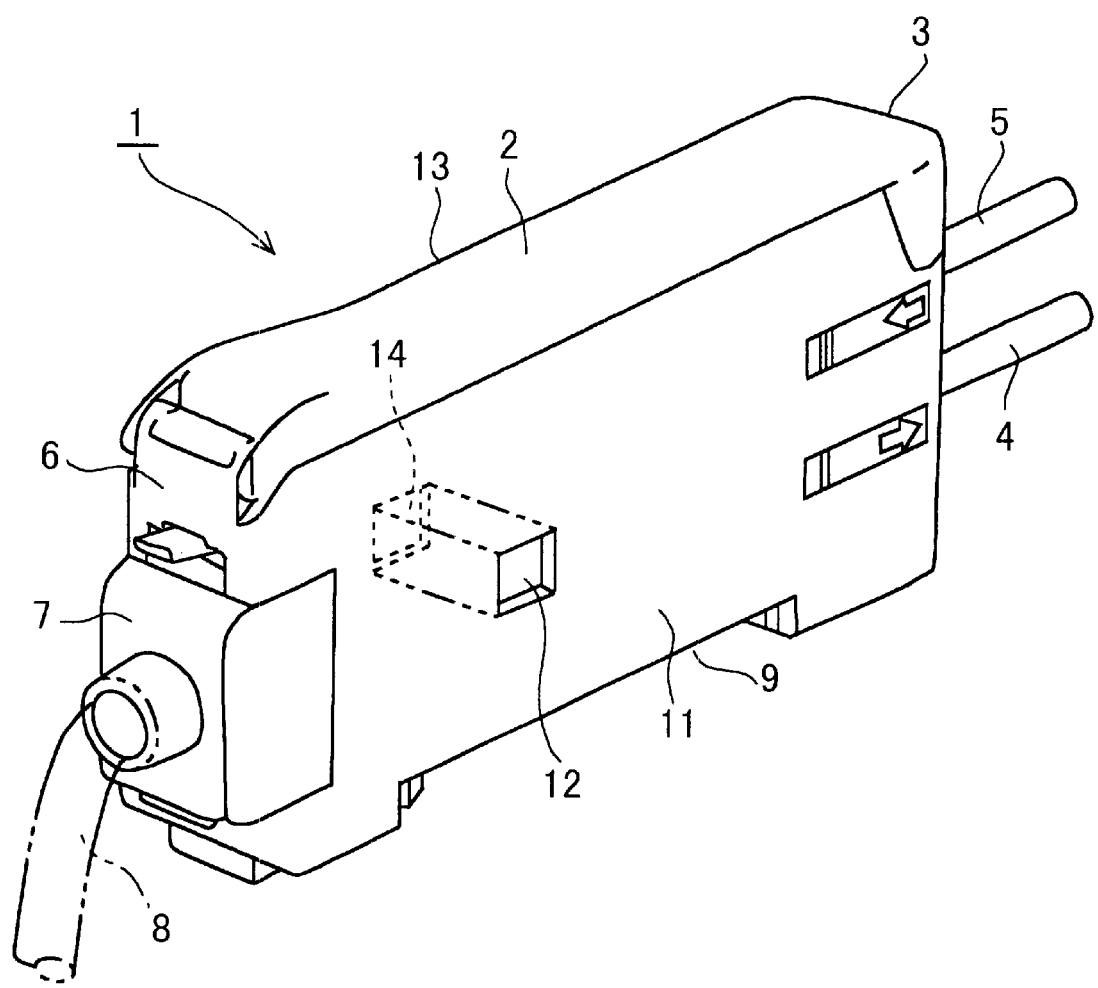
FIG. 1 is a perspective view of an embodiment of the sensor unit of the present invention.

An embodiment of the sensor unit of the present invention is illustrated in FIG. 1. The illustrated sensor unit 1 consists of an optical fiber type photoelectric sensor unit.

Referring to FIG. 1, the sensor unit 1 comprises a housing 2 having a relatively flat rectangular shape. An outgoing optical fiber cable 4 and an incoming optical fiber cable 5 extend from the rear end 3 of the housing 2. The free ends of these optical fiber cables 4 and 5 are connected to sensor heads 4a and 5a placed in a detection region as described hereinafter.

An electric cable (cord) 8 extends from the front end 6 of the housing 2 via a connector 7. This electric cable 8 conducts an output signal (such as an on/off signal, a signal indicating an amount of light, and so on) of a sensing circuit system (not shown in the drawing) provided inside the housing. The electric cable 8 is connected to control equipment (not shown in the drawing) such as a programmable logic controller (PLC). The bottom surface of the housing 2 is provided with a DIN rail mount groove 9 for mounting the sensor unit 1 on a DIN rail.

The right side 11 of the housing 2 is provided with an optical communication window 12 for right side communication, and the left side 13 of the housing 2 is provided with an optical communication window 14 for left side communication. These optical communication windows 12 and 14 are illustrated as through holes in the drawings, but are in fact each closed by a resin filter which allows infrared light to pass through but shuts off visible light, the outer surface of the filter being flat with the surrounding surface of the housing side surface.

As described in more detail hereinafter, behind the optical communication window 12 on the right side are disposed a light emitting device and a light receiving device (not shown in the drawing) for right side communication using infrared light. Likewise, behind the optical communication window 14 on the left side are disposed a light emitting device and a light receiving device (not shown in the drawing) for left side communication using infrared light.

Figure 2:
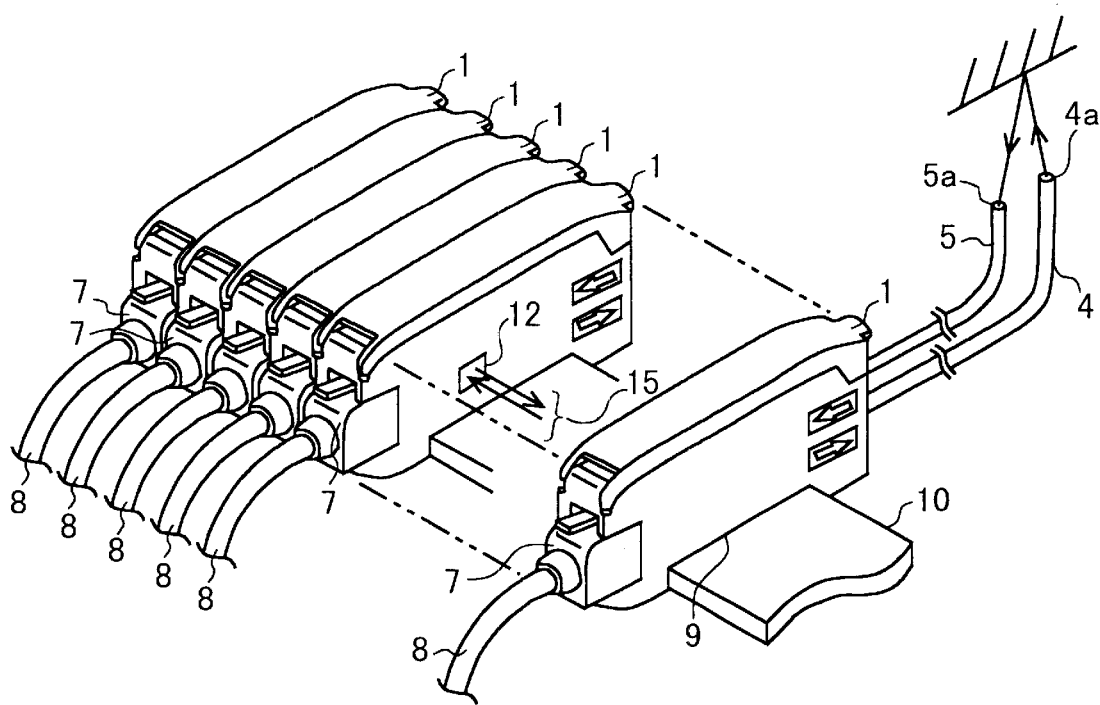
FIG. 2 is a perspective view of an embodiment of the sensor system of the present invention.

The perspective view of FIG. 2 shows a large number of sensor units 1 which are mounted on a DIN rail. As shown in FIG. 2, by arranging a large number of sensor units 1, with the DIN rail mount groove 9 provided in the bottom surface of each sensor unit fitted onto the DIN rail 10, closely one next to another, the sensor units 1 are aligned in a single file closely in contact with the adjacent sensor units 1. As a result, the optical communication window 12 as described before opposes the corresponding optical communication window 14. This enables a bi-directional optical communication using infrared light between each pair of adjacent sensor units 1 via the corresponding optical communication windows 12 and 14 as indicated by arrow 15 in the drawing, as described hereinafter.

Figure 3:
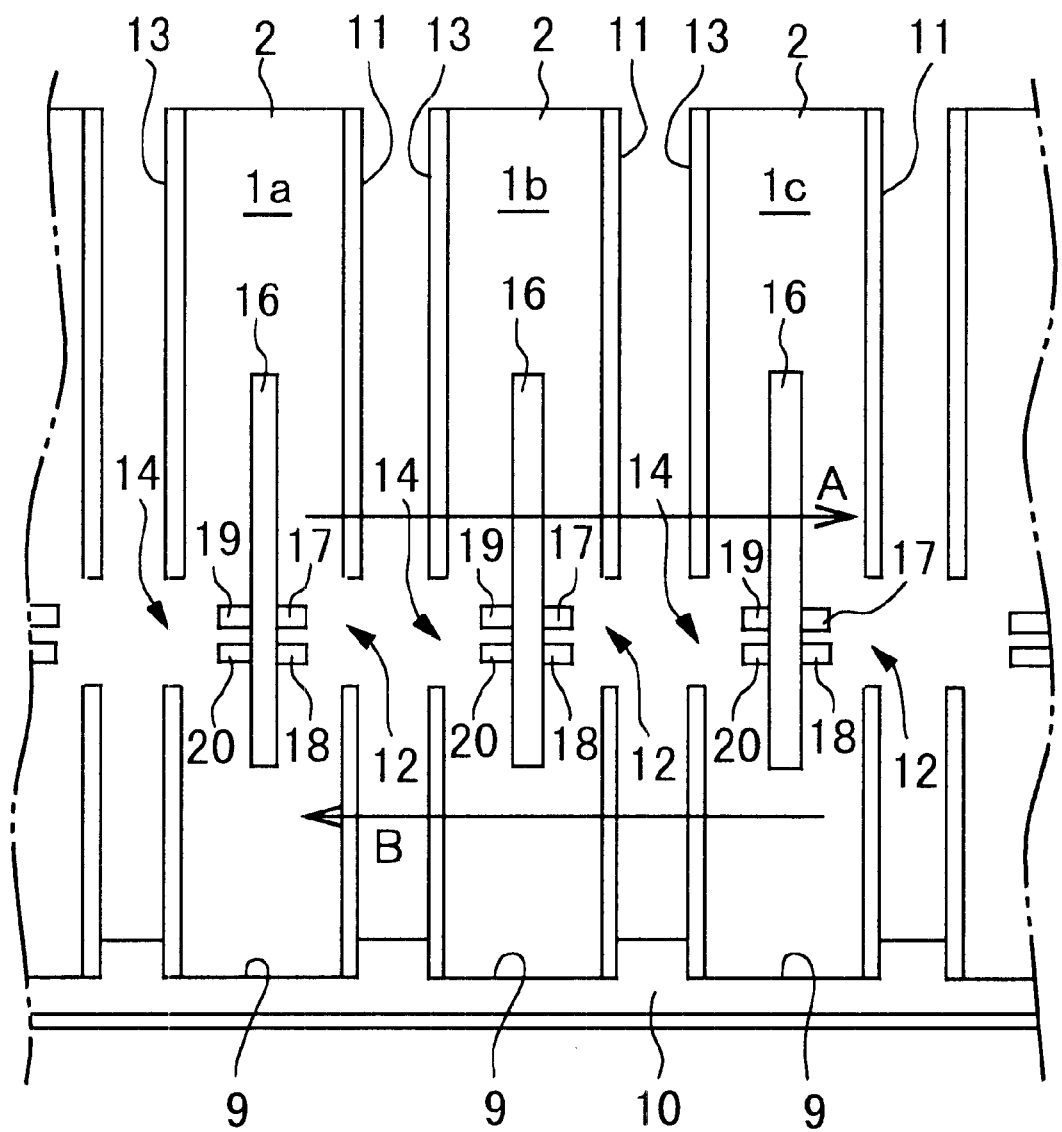
FIG. 3 is a sectional view showing the positional relationship of the optical communication windows with the corresponding light emitting devices and light receiving devices in an array of sensor units.

An exemplary arrangement for supporting the light emitting devices and light receiving devices in the housing 2 of each sensor unit 1 is shown in the sectional view of the housing in FIG. 3. In FIG. 3, three sensor units 1a, 1b and 1c are shown as being placed closely to one another.

As shown in the drawing, the housing 2 of each sensor unit 1a, 1b and 1c accommodates a circuit board 16 incorporated with various circuit components. The circuit board 16 is supported by a mechanism not shown in the drawing so as to be disposed in parallel with the right and left sides 11 and 13 of the housing 2.

Referring to FIG. 1, on the right side of the circuit board 16 are supported a light emitting device (for instance, an infrared light emitting diode) 17 and a light receiving device (for instance, a photodiode) 18 for right side communication. These devices 17 and 18 are positioned so as to oppose the optical communication window 12 provided on the right side 11 of the housing 2. Likewise, on the left side of the circuit board 16 are supported a light receiving device (for instance, a photodiode) 19 and a light emitting device (for instance, an infrared light emitting diode) 20 for left side communication. These devices 19 and 20 are positioned so as to oppose the optical communication window 14 provided on the left side 13 of the housing 2. Although not shown in the drawing, each of the right and left optical communication windows 12 and 14 is closed by a filter for shutting off visible light.

According to this structure, by repeating the process of receiving the light emitted from one of the light emitting elements 17 with the corresponding light receiving element 19 from one pair of adjacent sensor units to another, the signal can be transmitted in the direction indicated by arrow A in the drawing. By repeating the process of receiving the light emitted from one of the light emitting elements 20 with the corresponding light receiving element 18 from one pair of adjacent sensor units to another, the signal can be transmitted in the direction indicated by arrow B in the drawing. In other words, according to the illustrated example, data can be transferred in both directions among the sensor units 1a, 1b and 1c.

The right and left optical communication windows 12 and 14 of the housing 2 may be each fitted with a lens so as to improve the efficiency of emitting and receiving light between the mutually opposing light emitting device and light receiving device of the adjacent sensor units. The lenses may each consist of any optical lens, including a Fresnel lens.

Figure 4:
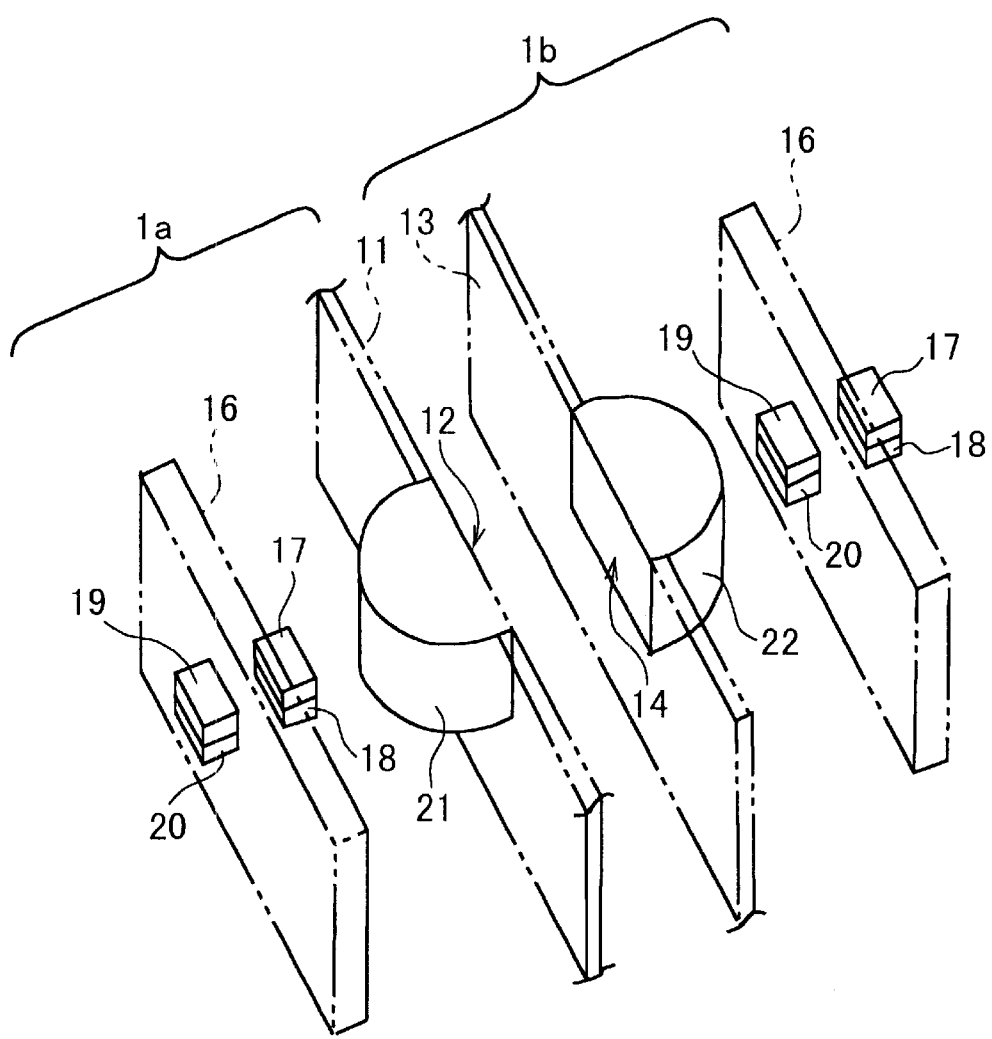
FIG. 4 is a schematic perspective view showing the positional relationship between the lenses and the light emitting devices and receiving devices in sensor units.
Figure 5:
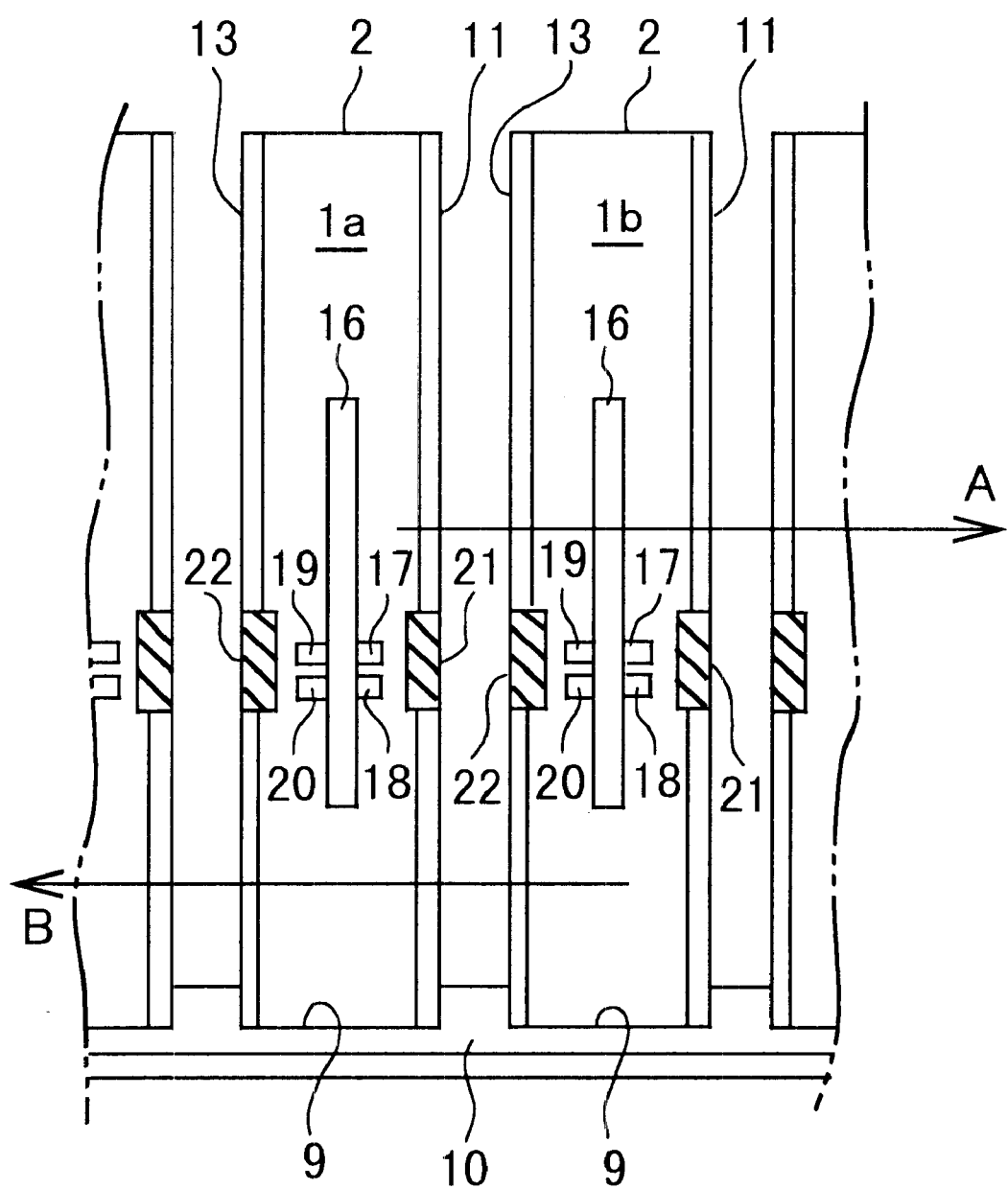
FIG. 5 is a sectional view showing the positional relationship between the optical communication windows, each fitted with an optical lens, and the light emitting devices and light receiving devices in an array of sensor units.

FIGS. 4 and 5 show an example in which a semi-cylindrical lens is used for the optical lens. As can be appreciated from these drawings, the semi-cylindrical lens 21 is fitted on the optical communication window 12 of the right side 11 of the housing with a flat surface thereof facing outward and its axial line oriented vertically. Likewise, the semi-cylindrical lens 22 is fitted on the optical communication window 14 of the left side 13 of the housing with a flat surface thereof facing outward and its axial line oriented vertically.

Therefore, the infrared light emitted from the light emitting device 17 of the sensor unit 1a converges under the action of the upper half of the semi-cylindrical lens 21, and is projected out of the optical communication window 12 as a parallel beam. The infrared light projected from the optical communication window 12 travels and eventually reaches the optical communication window 14 of the adjacent sensor unit 1b. The infrared light which has passed into the optical communication window 14 converges under the action of the upper half of the semi-cylindrical lens 22, and impinges upon the light receiving device 19 of the sensor unit 1b.

Likewise, the infrared light emitted from the light emitting device 20 of the sensor unit 1b converges under the action of the lower half of the semi-cylindrical lens 22, and is projected out of the optical communication window 14 as a parallel beam. The infrared light projected from the optical communication window 14 travels and eventually reaches the optical communication window 12 of the adjacent sensor unit 1a. The infrared light which has passed into the optical communication window 12 converges under the action of the lower half of the semi-cylindrical lens 21, and impinges upon the light receiving device 18 of the sensor unit 1a.

Figure 6:
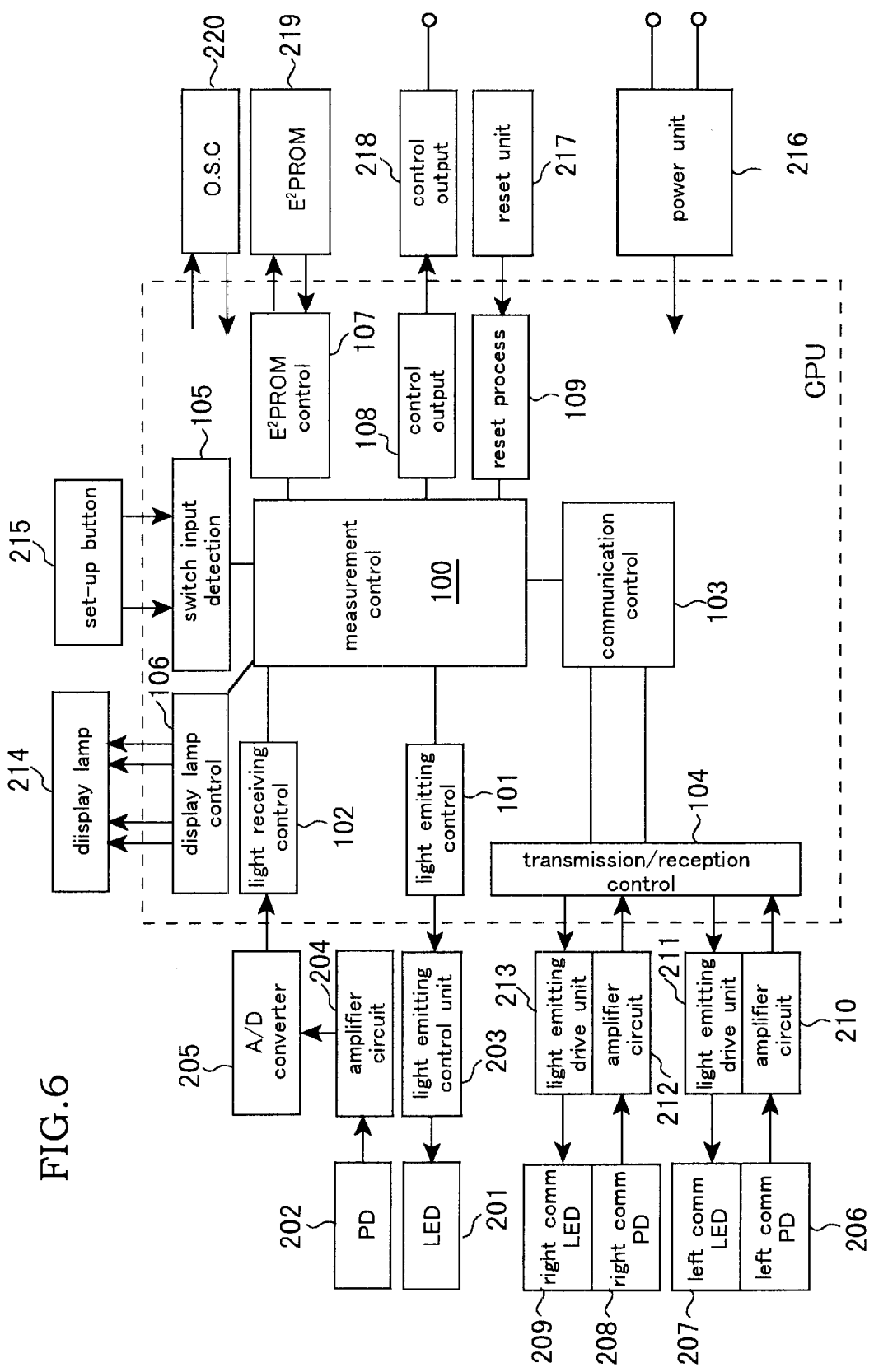
FIG. 6 is a functional block diagram showing the hardware and software structures in the sensor unit.

The electric structures of the hardware and software of the sensor unit 1 are illustrated in the functional block diagram of FIG. 6.

As shown in the drawing, the electric structure of the sensor unit 1 includes various processing functions (100 to 109) which are achieved by software or by a CPU, and various processing functions (201 to 220) which are achieved by hardware or by special circuits.

First of all, the sensing circuit system is described. A measurement control process 100 controls a light emitting control unit 203 through a light emitting control process 101, and causes a light emitting device (LED) 201 to emit infrared light. The signal produced from a light receiving device (PD) 202 as a result of receiving infrared light is amplified by an amplifier circuit unit 204, and after being converted into a digital signal by an A/D converter 205, is forwarded to the measurement control process 100 through a light receiving control process 102. The measurement control process 100 causes the received light signal from the light receiving control unit 102, either as it is or as a binary signal obtained by comparing the received light signal with a threshold value, to be forwarded to an external output of a control output unit 218 through a control output process 108.

The right and left communication circuit systems are now described in the following. A communication control process 103 controls a transmission/reception control process 104 which in turn causes left and right communication light emitting devices (LED) 207 and 209 to emit infrared light toward the adjacent sensor units by controlling left and right light emitting drive units 211 and 213. The infrared lights emitted from the adjacent sensor units are received by corresponding light receiving devices (PD) 206 and 208, and the received light signals are amplified by amplifier circuits 210 and 212 before they are finally forwarded to the communication control process 103 via the transmission/reception control process 104. The communication control process 103 executes an optical communication between each pair of adjacent sensor units by controlling the communication signal according to a prescribed protocol.

The control circuit system for a display lamp is described in the following. A display lamp control process 106 controls a display lamp 214. A switching input detection process 105 processes a signal from an external set-up button switch 215. A power unit 216 supplies power to the sensor unit as whole.

The signal obtained from an external reset unit 217 is forwarded to the measurement control process 100 through a reset process 109 to reset the measurement control.

As can be appreciated from the foregoing description, the sensor unit 1 according to the present invention comprises the housing 2 which can be arranged closely one next to another in a sensor unit array, and is adapted to be connected to the sensor heads 4a and 5a via the optical fiber cables 4 and 5. The housing 2 accommodates the sensing circuit system for achieving the desired sensing function in cooperation with the sensor heads 4a and 5a, the right optical communication circuit system 210, 211, . . . including the light emitting and receiving devices 208 and 209 for conducting a bi-directional optical communication with the right adjacent sensor unit in a sensor unit array having the sensor units arranged closely one next to another, and the left optical communication circuit system 212, 213, . . . including the light emitting and receiving devices 206 and 207 for conducting a bi-directional optical communication with the left adjacent sensor unit in a sensor unit array having the sensor units arranged closely one next to another. Thereby, a bi-directional optical communication between each pair of adjacent sensor units is enabled in the sensor unit array.

The right and left sides 11 and 13 of the housing 2 of the sensor unit 1 are planar, and are not provided with any connector relying on the engagement between a projection and a recess. Therefore, when replacing any one of the sensor units mounted on the DIN rail 10, it would not be obstructed by the adjacent sensor units. This simplifies the work involved in removing and mounting a sensor unit from and onto the DIN rail 10. The design of the metallic die assembly for molding the housing is also simplified because no consideration is required for any connectors using an engagement between a projection and a recess that would be otherwise provided on each side of the housing.

If semi-cylindrical lenses 21 and 22 are used for the optical lenses, they can be each used commonly for a light emitting device and a light receiving device so that the work required for aligning the optical center line is simplified and the space required for receiving the lens can be minimized.

The process for preventing mutual interferences in a photoelectric sensor system using a plurality of such sensor units is described in the following with reference to FIGS. 7 and 8.

Figure 7:
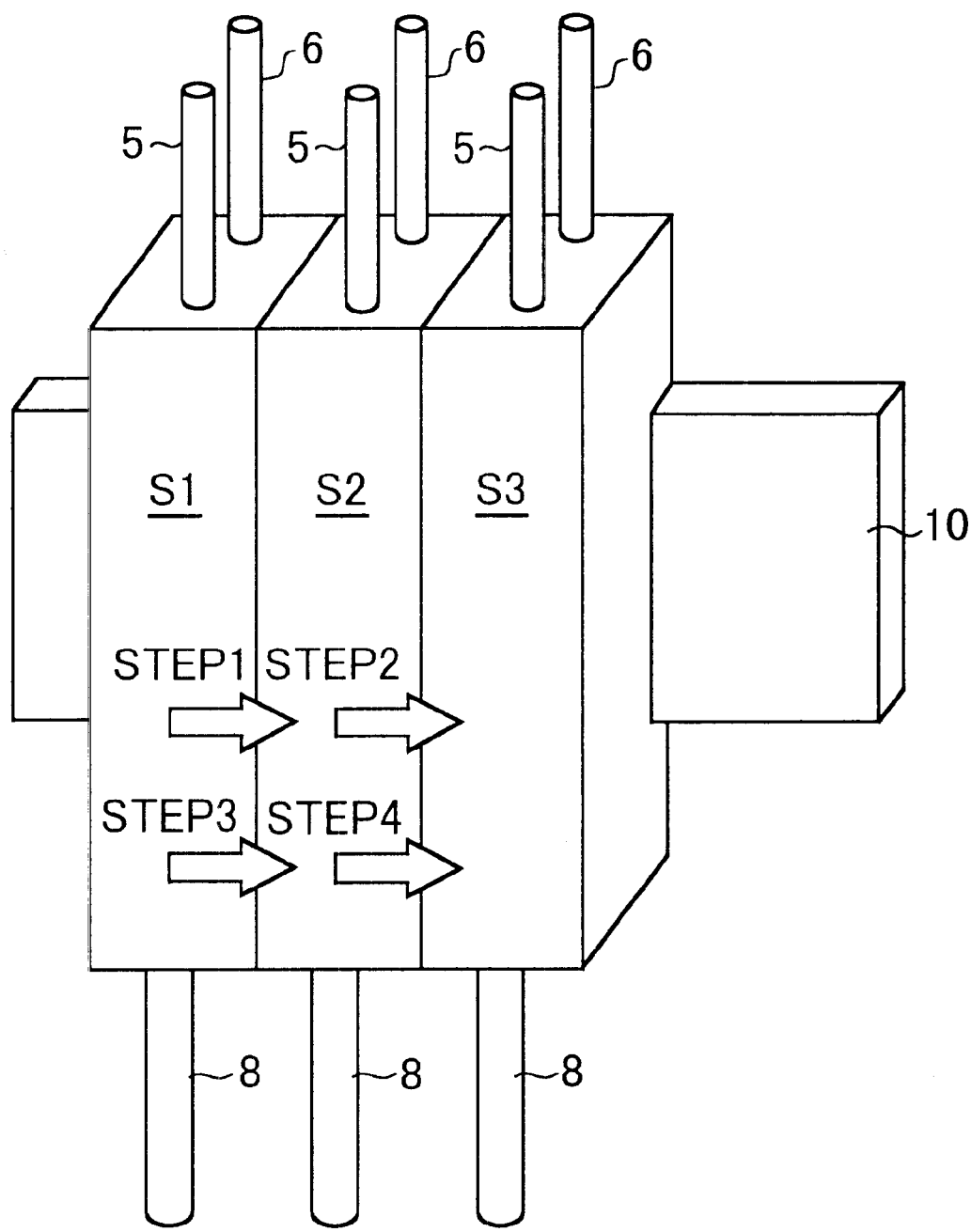
FIG. 7 is a schematic perspective view of a sensor system showing an exemplary arrangement of sensor units to illustrate the process of preventing mutual interferences.
Figure 8:
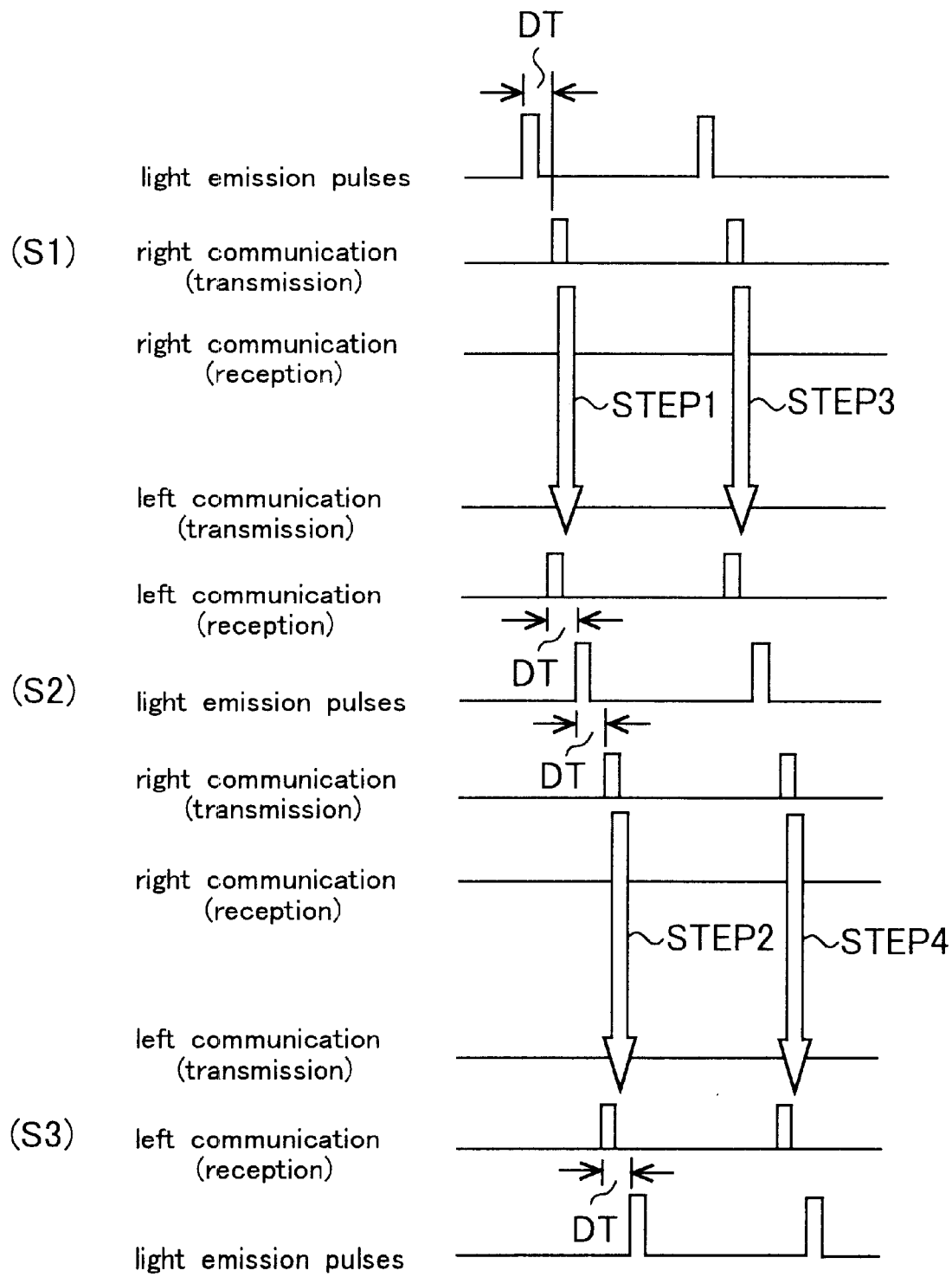
FIG. 8 is a timing chart illustrating the process of preventing mutual interferences.

An exemplary arrangement of sensor units is shown in FIG. 7, and the synchronization timing for preventing mutual interferences is shown in FIG. 8. In this example, three sensor units S1, S2 and S3 are used.

Referring to these drawings, in step 1, following a light emission from the first sensor unit S1, a synchronization signal is forwarded to the second sensor unit S2 with a small time delay (DT).

In step 2, following a light emission from the second sensor unit S2, a synchronization signal is forwarded to the third sensor unit S3 with a small time delay (DT). In other words, in step 2, the sensor unit S2 passes a synchronization signal from the first sensor unit S1 to the third sensor unit S3 in the manner of a bucket brigade.

In step 3, following a light emission from the first sensor unit S1, a synchronization signal is forwarded to the second sensor unit S2 with a small time delay (DT).

In step 4, the second sensor unit S2 emits light following the reception of the synchronization signal with a small time delay (DT), and then, with an additional small time delay (DT), transmits a synchronization signal to the third sensor unit S3. In other words, in step 4, the second sensor unit S2 passes a synchronization signal from the first sensor unit S1 to the third sensor unit S3 in the manner of a bucket brigade.

The first sensor unit S1 emits light at a regular interval. Each transmission of a synchronization signal may be accompanied by a handshaking procedure to acknowledge receipt of the signal.

According to the actions which take place in steps 1 to 4, each light emission pulse of each sensor unit S1 to S3 is shifted from one sensor unit to another. As a result, the mutual interferences between the light emission pulses of adjacent sensor units can be avoided.

Figure 9:
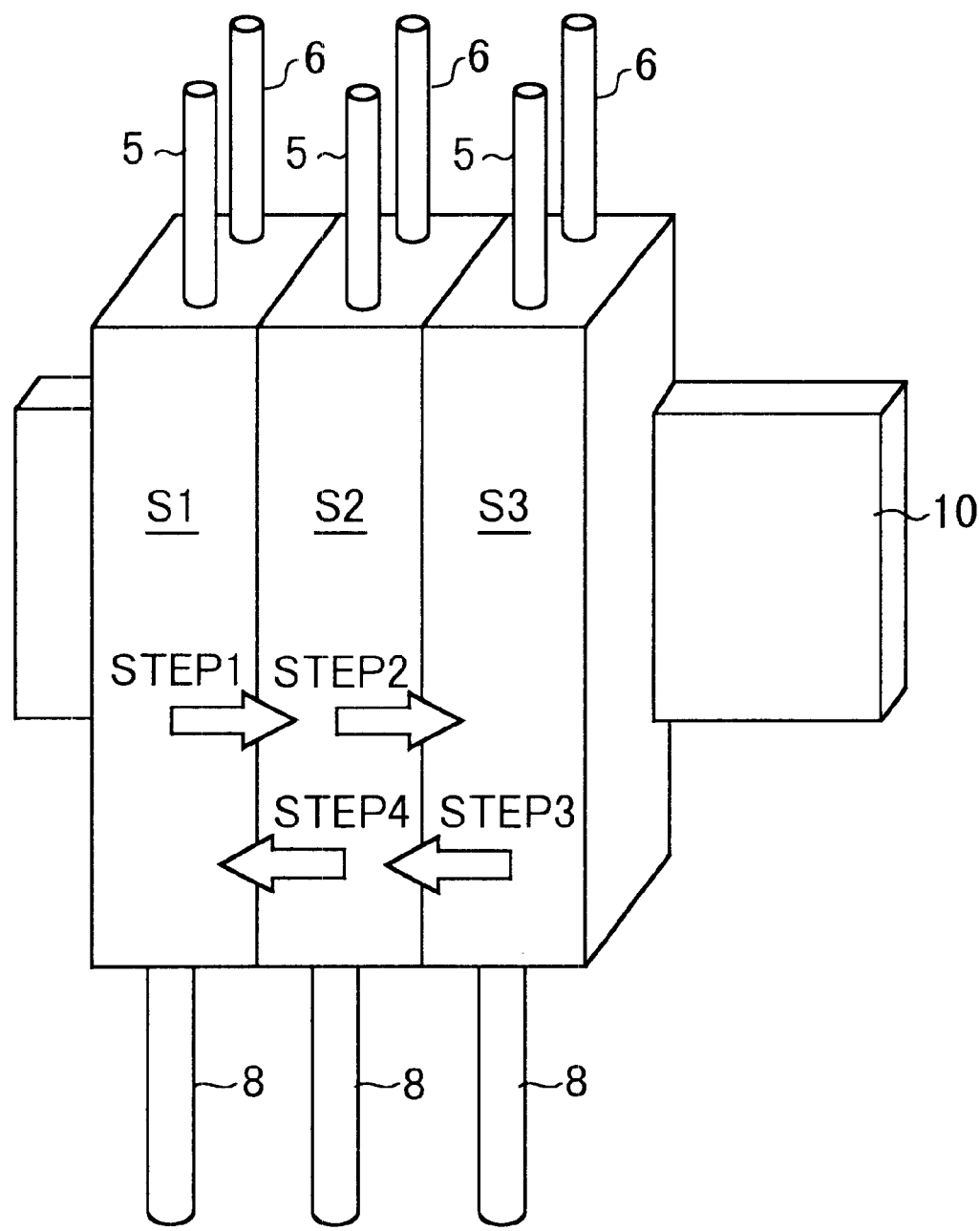
FIG. 9 is a schematic perspective view of a sensor system showing an exemplary arrangement of sensor units to illustrate the process of bi-directional data communication.
Figure 10:
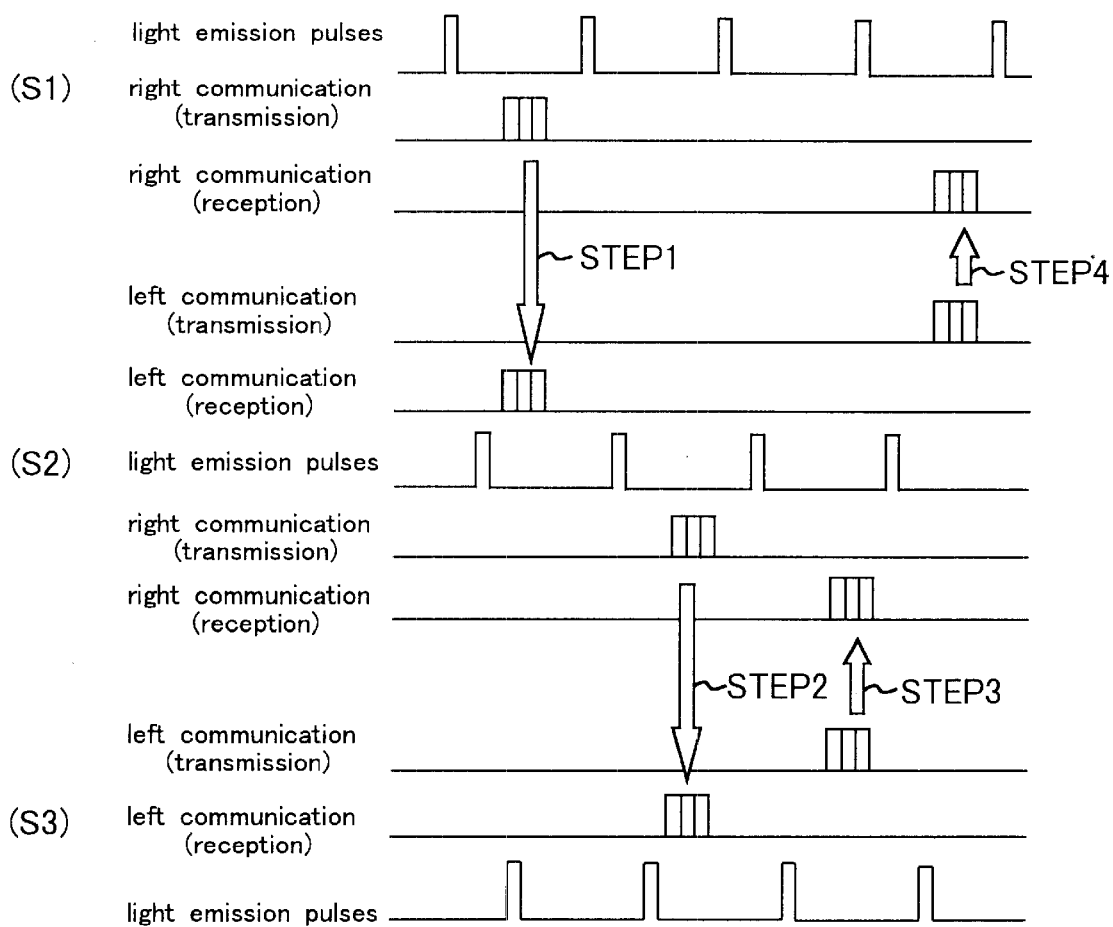
FIG. 10 is a timing chart illustrating the process of bi-directional data communication.

The bi-directional communication between the sensor units which is also an important feature of the present invention is described in the following. An exemplary arrangement of sensor units is illustrated in FIG. 9, and data communication timing is illustrated in FIG. 10. In this example also, three sensor units S1, S2 and S3 are used. The data transfer is executed in synchronism with each light emission pulse.

The procedure for the first sensor unit S1 to obtain requested data is described in the following with respect to the case in which the first sensor unit S1 forwards a data request command to the third sensor unit S3, and in response to this, the third sensor unit S3 executes the data request command and forwards the requested data to the first sensor unit S1.

In these drawings, step 1 corresponds to the action of the first sensor unit S1 forwarding a data request command to the second sensor unit S2.

In step 2, the second sensor unit S2 forwards a data request command to the third sensor unit S3 upon the onset of the following cycle of light emission. In other words, in step 2, the second sensor unit S2 passes a data request command from the first sensor unit S1 to the third sensor unit S3 in the manner of a bucket brigade.

In step 3, the third sensor unit S3 forwards the requested data to the second sensor unit S2 upon the onset of the following cycle of light emission.

In step 4, the second sensor unit S2 forwards the requested data to the first sensor unit S1 upon the onset of the following cycle of light emission. In other words, in step 4, the second sensor unit S2 passes the requested data from the third sensor unit S3 to the first sensor unit S1 in the manner of a bucket brigade.

According to the actions which take place in steps 1 to 4, the first sensor unit S1 obtains the requested data by the first sensor unit S1 forwarding a data request command to the third sensor unit S3, and in response to this, the third sensor unit S3 executing the data request command, and returning the requested data back to the first sensor unit S1.

Figure 11A:
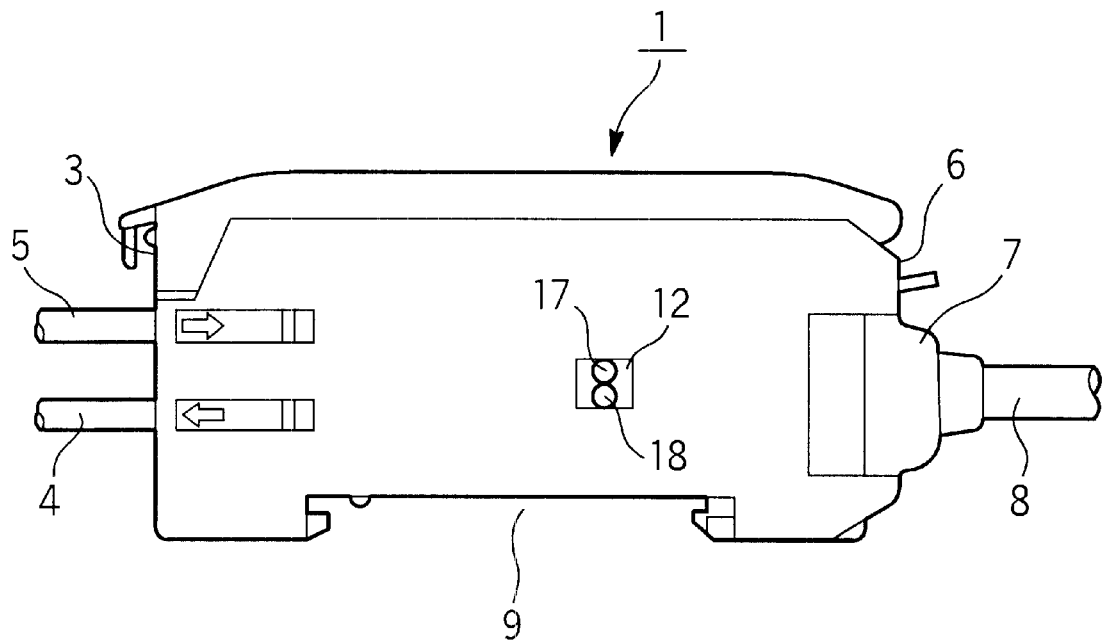
FIGS. 11(A–B) shows illustrative side views of sensor unit housings having two different exemplary optical communication windows.
Figure 11B:
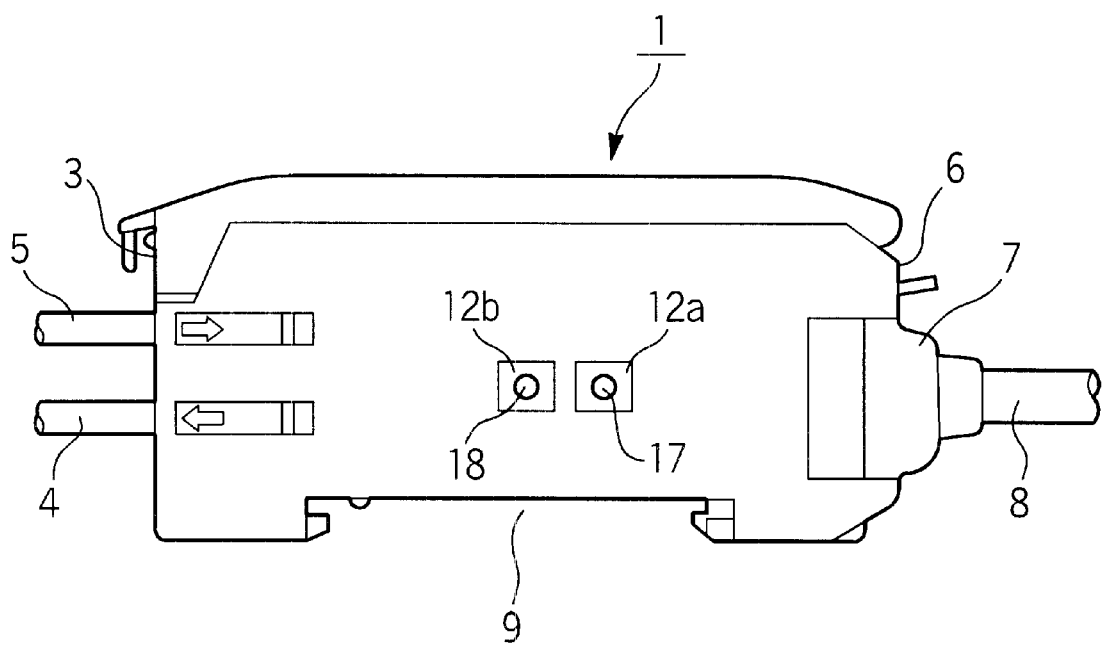

The optical communication window which is formed in the housing 2 of the sensor unit 1 according to the present invention may take various different forms. FIG. 11 shows two such examples. In the case of the example illustrated in FIG. 11(a), the optical communication window consists of a window 12 which is commonly used for light emission and reception as described earlier, and both the light emitting device 17 and light receiving device 18 are therefore placed in the same window 12. In the case of the example illustrated in FIG. 11(b), the optical communication window consists of two separate windows 12a and 12b for light emission and reception, respectively, and the light emitting device 17 and light receiving device 18 are placed in the window for light reception 12b and the window for light emission 12a, respectively.

Figure 12:
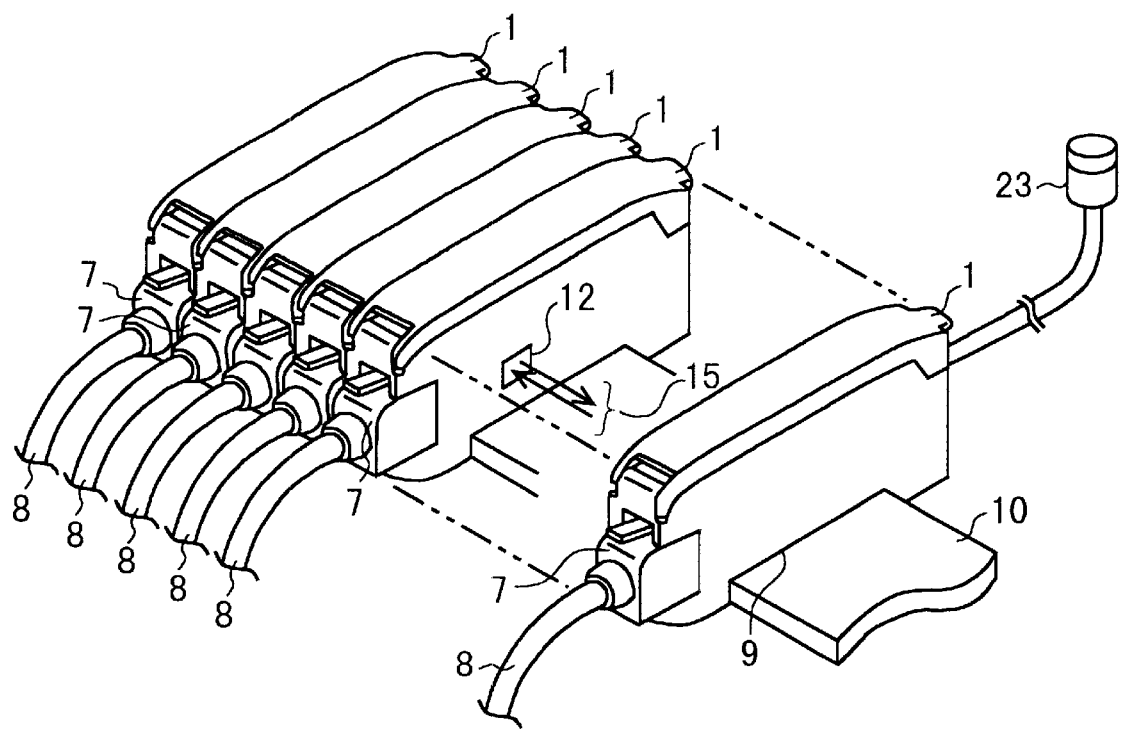
FIG. 12 is a perspective view of the sensor system of the present invention implemented as a proximate sensor system.

The sensor unit 1 of the present invention may consist of various sensors other than the optical fiber type photoelectric sensor. FIG. 12 shows an example in which each sensor unit 1 is constructed as a proximate sensor. In this example, each sensor head 23 is provided with a coil serving as an inductive element or an electrode serving as a capacitive element which forms an oscillation circuit in cooperation with other circuit components included in the sensing circuit system accommodated in the unit housing. As an object to be detected approaches the sensor head 23, the inductance or capacitance of the oscillation circuit changes, and this in turn changes the oscillation amplitude and/or frequency. Typically, the circuit which is used detects the presence of an object from changes in the oscillation properties.

Figure 13:
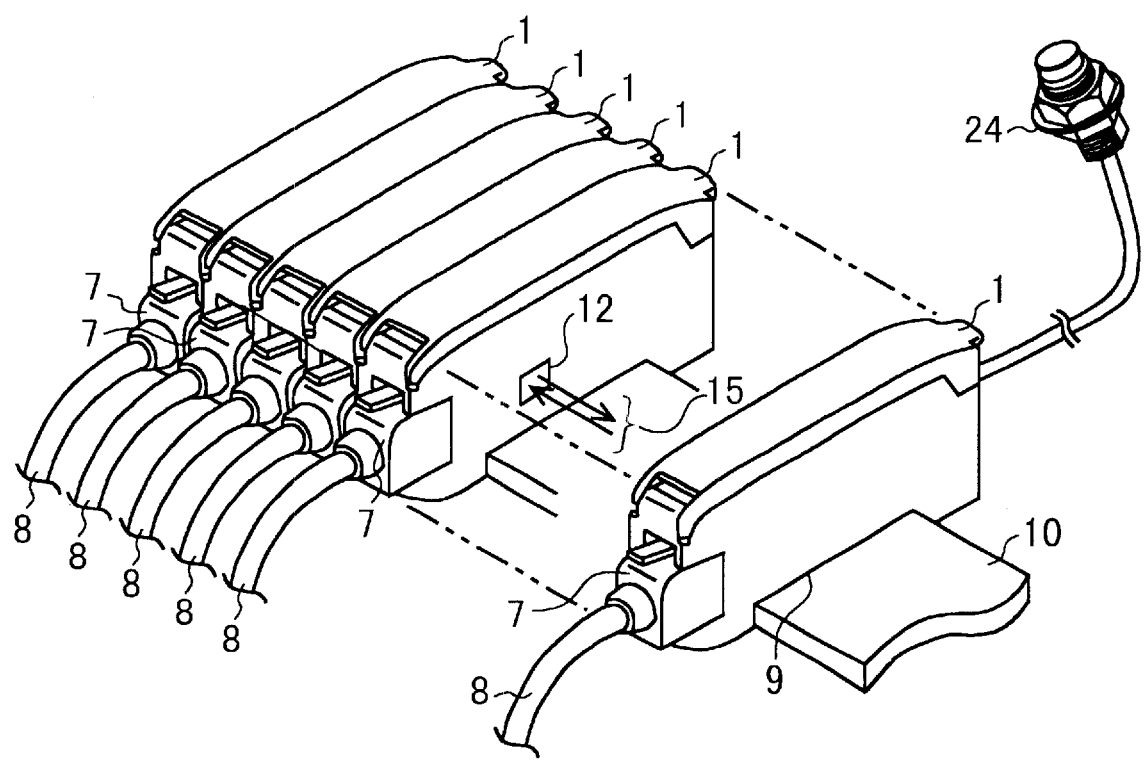
FIG. 13 is a perspective view of the sensor system of the present invention implemented as ultrasonic sensor system.
Figure 14:
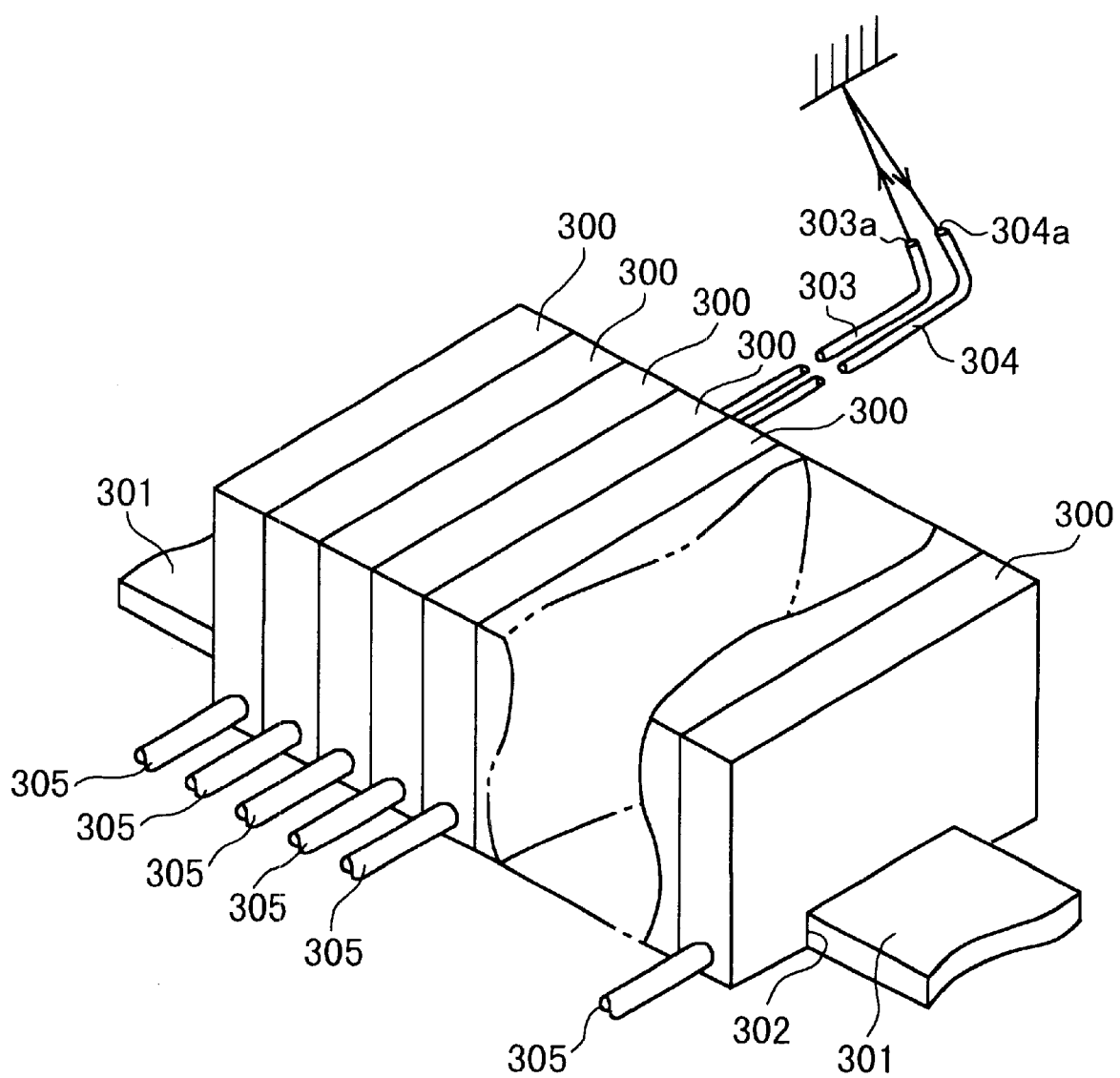
FIG. 14 is a perspective view of a conventional sensor system.

FIG. 13 shows an example in which each sensor unit 1 is constructed as an ultrasonic sensor. In this example, each sensor head 24 consists of an ultrasonic horn for both reception and transmission. The sensing circuit system which is accommodated in each sensor unit typically detects that presence of an object as changes in the level of the received ultrasonic waves detected by the sensor head 2.

INDUSTRIAL APPLICABILITY

As can be appreciated from the foregoing description, according to the sensor unit of the present invention, a highly reliable bi-direction data transmission is enabled between each pair of adjacent sensor units forming a sensor system.

According to the sensor unit of the present invention, in addition to enabling a highly reliable bi-direction data transmission between each pair of adjacent sensor units, because the housing is provided with flat sides, the handling of the sensor unit when mounted on a DIN rail is improved, and the manufacturing cost is reduced.

Furthermore, according to the sensor system of the present invention, a bi-direction data transmission is enabled between each pair of adjacent sensor units forming the sensor system in a highly reliable manner so that more enhanced data set-up manipulation and monitoring are enabled through integration of various functions in each sensor unit.

What is claimed is:

1. A sensor unit for a multiple sensor unit array containing a plurality of such sensor units closely one next to another,
   the sensor unit comprising a housing that is adapted to be mounted closely one next to another and to be connected to a sensor head via a cable,
   the housing accommodating a sensing circuit system for achieving a desired sensing function in cooperation with the sensor head, a first optical communication circuit system including a light emitting device and a light receiving device for conducting an optical bi-directional communication with one of the adjacent sensor units in a multiple sensor unit array, and a second optical communication circuit system including a light emitting device and a light receiving device for conducting an optical bi-directional communication with the other of the adjacent sensor units,
   whereby the sensor unit is enabled to conduct an optical bi-directional communication with each of the adjacent sensor units in the multiple sensor unit array.

2. A sensor unit according to claim 1, wherein the housing is provided with a first optical communication window provided on one side thereof for conducting an optical bi-directional communication with one of the adjacent sensor units in the sensor unit array, a second optical communication window provided on the other side thereof for conducting an optical bi-directional communication with the other of the adjacent sensor units in the sensor unit array, whereby the sensor unit is enabled to conduct an optical bi-directional communication with each of the adjacent sensor units in the sensor unit array via a corresponding one of the optical communication windows.

3. A sensor unit according to claim 2, wherein the optical communication window on each side of the housing is fitted with an optical lens to thereby improve an efficiency in emitting and receiving light in the optical communication by the light emitting device and light receiving device.

4. A sensor unit according to claim 3, wherein the optical lens provided in the optical communication window on each side of the housing comprising a semi-cylindrical lens having a flat surface facing outward and shared by the light emitting device and light receiving device, the light emitting device and light receiving device being arranged along an axial direction of the semi-cylindrical lens, and being reversed in position from one side of the housing to the other so as to complementarily oppose the counterparts thereof in the corresponding adjacent sensor unit in the sensor unit array.

5. A sensor unit according to claim 1, further comprising data transfer control means for enabling a bi-directional transfer of data between each pair of adjacent sensor units in the manner of a bucket brigade by controlling the first and second optical communication circuit systems.

6. A sensor unit according to claim 1, wherein the sensor unit comprises a photoelectric sensor.

7. A sensor unit according to claim 1, wherein the sensor unit comprises an ultrasonic sensor.

8. A sensor unit according to claim 1, wherein the sensor unit comprises a proximate sensor.

9. A sensor system comprising a plurality of sensor units arranged in a multiple sensor unit array, each sensor unit including a housing that is adapted to be mounted closely one next to another and to be connected to a sensor head via a cable, the housing accommodating a sensing circuit system for achieving a desired sensing function in cooperation with the sensor head, a first optical communication circuit system including a light emitting device and a light receiving device for conducting an optical bi-directional communication with one of the adjacent sensor units in the multiple sensor unit array, and a second optical communication circuit system including a light emitting device and a light receiving device for conducting an optical bi-directional communication with the other of the adjacent sensor units, whereby each sensor unit is enabled to conduct an optical bi-directional communication with each of the adjacent sensor units in the multiple sensor unit array.

10. A sensor system according to claim 9, wherein the housing is provided with a first optical communication window provided on one side thereof for conducting an optical bi-directional communication with one of the adjacent sensor units in the sensor unit array, a second optical communication window provided on the other side thereof for conducting an optical bi-directional communication with the other of the adjacent sensor units in the sensor unit array, whereby the sensor unit is enabled to conduct an optical bi-directional communication with each of the adjacent sensor units in the sensor unit array via a corresponding one of the optical communication windows.

11. A sensor system according to claim 10, wherein the optical communication window on each side of the housing is fitted with an optical lens to thereby improve an efficiency in emitting and receiving light in the optical communication by the light emitting device and light receiving device.

12. A sensor system according to claim 11, wherein the optical lens provided in the optical communication window on each side of the housing comprises a semi-cylindrical lens having a flat surface facing outward and shared by the light emitting device and light receiving device, the light emitting device and light receiving device being arranged along an axial direction of the semi-cylindrical lens, and being reversed in position from one side of the housing to the other so as to complementarily oppose the counterparts thereof in the corresponding adjacent sensor unit in the sensor unit array.

13. A sensor system according to claim 9, further comprising data transfer control means for enabling a bi-directional transfer of data between each pair of adjacent sensor units in the manner of a bucket brigade by controlling the first and second optical communication circuit systems.

14. A sensor system according to claim 9, wherein the sensor unit comprises a photoelectric sensor.

15. A sensor system according to claim 9, wherein the sensor unit comprises an ultrasonic sensor.

16. A sensor system according to claim 9, wherein the sensor unit comprises a proximate sensor.

17. A sensor unit for a multiple sensor unit array, comprising:

a housing adapted to be mounted closely one next to another and to be connected to a sensor head;

a first optical communication window provided on one side of the housing to conduct an optical bi-directional communication with one of the adjacent sensor units in a multiple sensor unit array;

a second optical communication window provided on the other side of the housing to conduct an optical bi-directional communication with the other adjacent sensor unit in the multiple sensor unit array;

whereby the sensor unit is enabled to conduct an optical bi-directional communication with each of the adjacent sensor units in the multiple sensor unit array.

18. A sensor unit according to claim 17, wherein the first and second optical communication windows each consist of a single window for both light emission and transmission.

19. A sensor unit according to claim 17, wherein the first and second optical communication windows each consist of a pair of windows for light emission and transmission, respectively.

20. A sensor unit according to claim 17, wherein the first and second optical communication windows are each closed by a filter for shutting off visible light.

21. A sensor unit according to claim 17, wherein the sensor unit comprises a photoelectric sensor.

22. A sensor unit according to claim 17, wherein the sensor unit comprises an ultrasonic sensor.

23. A sensor unit according to claim 17, wherein the sensor unit comprises a proximate sensor.

* * * * *